United States Patent
Heng et al.

(10) Patent No.: US 9,330,116 B2
(45) Date of Patent: May 3, 2016

(54) DETERMINING HIERARCHICAL PATHS TO NODES

(71) Applicant: Oracle International Corporation, Redwood Shores, CA (US)

(72) Inventors: Lijie Heng, Redwood Shores, CA (US); Chi Ching Chui, Redwood Shores, CA (US); Yi Ouyang, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 294 days.

(21) Appl. No.: 13/832,691

(22) Filed: Mar. 15, 2013

(65) Prior Publication Data

US 2014/0280363 A1    Sep. 18, 2014

(51) Int. Cl.
G06F 17/30        (2006.01)

(52) U.S. Cl.
CPC .... *G06F 17/30289* (2013.01); *G06F 17/30221* (2013.01); *G06F 17/30327* (2013.01)

(58) Field of Classification Search
CPC ................................................ G06F 17/30286
USPC .......... 707/741, 770, 778, 802; 715/234, 713, 715/853, 854
See application file for complete search history.

(56) References Cited

U.S. PATENT DOCUMENTS

| | | | |
|---|---|---|---|
| 7,627,547 B2 | 12/2009 | Jain et al. | |
| 8,176,084 B2 * | 5/2012 | Chowdhury | 707/797 |
| 8,775,433 B2 * | 7/2014 | Green et al. | 707/741 |
| 2005/0076312 A1 * | 4/2005 | Gardner et al. | 715/853 |
| 2007/0016605 A1 * | 1/2007 | Murthy et al. | 707/102 |
| 2007/0118561 A1 | 5/2007 | Idicula et al. | |
| 2007/0198545 A1 | 8/2007 | Ge et al. | |
| 2009/0276733 A1 * | 11/2009 | Manyam et al. | 715/854 |
| 2011/0093467 A1 * | 4/2011 | Sharp et al. | 707/741 |

OTHER PUBLICATIONS

Haifeng Jiang et al., XParent: An Efficient RDBMS-Based XML Database System, 2002, 2 pages.*

* cited by examiner

*Primary Examiner* — Jean B Fleurantin
(74) *Attorney, Agent, or Firm* — Hickman Palermo Becker Bingham LLP

(57) ABSTRACT

Methods, machines, and stored instructions are provided for determining hierarchical paths to nodes based on stored information about the nodes. A node analyzer analyzes a hierarchy to create mappings that represent the hierarchy. The mappings may include a "parent mapping" that maps selected-level nodes to parent nodes of the selected-level nodes, and a "path mapping" that maps a plurality of nodes other than the selected-level nodes to a plurality of paths, within the hierarchy, to the plurality of nodes. A path module then determines path(s) to specified node(s) at least in part by mapping the specified node(s) to particular parent node(s) of the specified node(s) using the parent mapping. The path module also maps the particular parent node(s) to particular path(s) using the path mapping. The information from the path and parent mappings may be assembled to form path(s) within the hierarchy to the specified node(s).

26 Claims, 6 Drawing Sheets

DETERMINING HIERARCHICAL PATHS TO NODES

TECHNICAL FIELD

The technical field relates to determining hierarchical paths to nodes based on stored information about the nodes.

BACKGROUND

Hierarchical Data

Computer systems store, manage, and analyze various types of data. Some types of stored data may include unstructured data values, which may have little or no relationship to each other. Other types of stored data may include structured data values that define a hierarchy. Structured data values relate to each other based on how or where the values are stored, how the values are organized or arranged with respect to each other in storage, references between the values, or some other stored indication that the values are associated with different levels in the hierarchy. The hierarchy defined by structured data values may be equivalent to a tree having one root or top-level node, a set of distinct trees having many roots, a set of interconnected trees having many roots, or some other graph or set of nodes and connections arranged in levels.

In a structured set of data, different data values are often represented as "nodes" at different levels in the hierarchy. The nodes may be connected by edges or links, such as explicit references or implicit relationships based on the structure, to one, a few, many, or even all of the other nodes in the graph. In many structured data sets, nodes are connected to other nodes that are immediately above or below the nodes in the hierarchy. A node that is connected to a given node and positioned immediately above the given node in the hierarchy is referred to as a "parent" of the given node. The parent and other nodes that are connected, either directly or indirectly, to the given node and above the given node in the hierarchy, such as the parent's parent (i.e., the given value's grandparent), are referred to as "ancestors" of the given node. A node that is connected to a given node and positioned immediately below the given node is referred to as a "child" of the given node. The child and other nodes that are connected, either directly or indirectly, to the given node and below the given node in the hierarchy, such as the child's child (i.e., the given value's grandchild), are referred to as "descendants" of the given node. In some structured sets of data, nodes higher up in the hierarchy refer to more general categories such as families or genera. Nodes lower down in the hierarchy may refer to species or other examples within the categories. In other structured sets of data, the hierarchy merely serves as an example organization of data values, and the levels may be assigned to the values according to some other reason or even arbitrarily.

For a given node in a hierarchy, there may be one or multiple paths that connect the given node to other nodes in the hierarchy. A path of connections or edges between two nodes in a hierarchy is referred to as a "hierarchical path." The hierarchical path may be defined by any nodes that are between the two nodes. For example, a first node, "A," may be connected to a second node, "B," which is then connected to a third node, "C." An example path from A to C may be A/B/C. In the examples, "A," "B," and "C" may be the node values or may merely be the names of nodes that have other values. For example, node A may store the value "employees," and node B may store the value "Smith," and node C may store the value "engineer." The values represented by the nodes may or may not be related to the hierarchical position of the nodes.

Hierarchical data sets may be stored in any data structure(s) or stored object(s) that retain the hierarchical information about the stored values. In one example, different nodes may be stored as different rows in a table, and these different rows may each be associated with hierarchical information such as a hierarchical key that indicates the position of the row within the hierarchy.

In another example, the different nodes may be stored as marked, tagged, or labeled data values within a document of marked-up text. The context for a given data value may be provided by a single label or a combination of labels, such as a hierarchical path of labels. In one example, a value of "Tim" may be prefaced with a label of "Name". Various markup signals may be used to distinguish between the data values and the labels themselves. For example, a label may be marked with a "//", such as in "//Name Tim," or a "—", such as in "—Name Tim". In many markup languages such as XML, the label is provided within angle brackets, such as in "<Name>Tim." The end of the data value may also be marked. For example, the end may be marked with "</Name>." The end may also be marked by the beginning of another label, for example "—Name Tim—Age 25". The marked up data may indicate a hierarchical structure such that a single data value falls under a path of labels, such as in "<CONTACT><NAME> Tim </NAME></CONTACT>," where "Tim" falls under the path of "CONTACT/NAME."

Data structures that store structured data sets may be traversed, utilizing stored edges or links between nodes, to find nodes that fall under specified paths. For example, the structured data sets may be traversed to find nodes under the path "A/B/C." Traversing a structured data set by jumping from node to node may be computationally expensive, especially for longer paths, and such traversal may involve a computation time that is dependent on the depth of the hierarchy. Each lookup involves loading information about a node, and following a link from the node to another node; traversal of a path may involve at least one lookup per level in the path.

Nodes may also be directly identified within data structures, without traversing the structures from node to node, based on physical locations or other identifiers associated with the nodes. For example, a node identified as node "123" may be located using an index that stores node identifiers and node locations. As another example, the node may be located directly using a physical location or virtual location of the node in storage. This manner of locating nodes does not account for the path to the node.

Some systems maintain path tables for hierarchical sets of data. A path table stores all possible paths to each node in the hierarchy, and the path table may be used to locate a node based on the path to the node but without traversing the structure from node to node. For example, the path table may identify three possible paths, such as "A/B1/C," "A/B2/C," and "A/B3/C," to a particular node, "C." A single update to the hierarchy, such as moving node C up a level to a new position alongside nodes B1, B2, and B3, may change several paths that are stored in the path table, such as the paths to node C and any descendants of node C, and updating these paths is computationally expensive. Also, storing all possible paths for every node in the hierarchy may consume more storage space than the underlying data that the path table represents. For example, node B1 may be listed in the path table as part of a possible path to node C, node D, node E, and node F, which may be at lower levels in the hierarchy.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
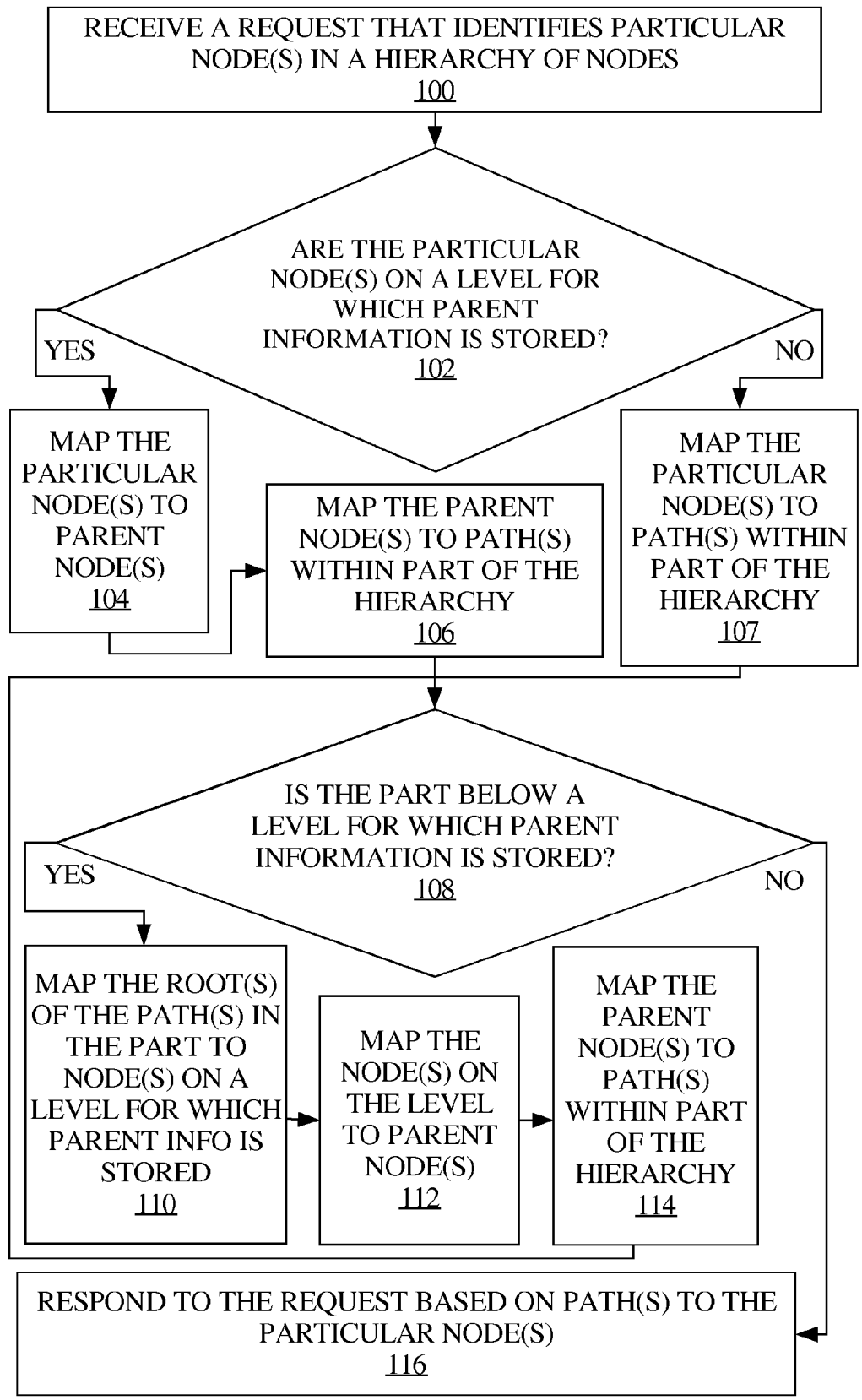
FIG. 1 illustrates an example process for determining path(s) to node(s) in a hierarchy using stored information about the node(s).

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for determining hierarchical paths to nodes based on stored information about the nodes. These techniques may be implemented as specially configured computer system(s), particular method(s) implemented by the computer system(s), and/or particular instruction(s) stored on non-transitory or physical electronic storage media/medium for implementation by the computer system(s). For example, the computer systems may include a combination of stored instructions of a particular type and hardware configured to execute instructions of the particular type such that the stored instructions, when executed by the hardware, cause performance of the particular methods.

In one embodiment, a structured data coordinator operating on computing device(s) receives, retrieves, loads, maintains, or otherwise stores data that defines a hierarchy of nodes. The structured data coordinator makes the stored data available to a node analyzer, which analyzes the stored data to create mappings to be stored in association with the stored data, to replace the stored data, or to otherwise represent the hierarchy. The stored mappings may include a "parent mapping" that maps selected-level nodes, such as leaf nodes, nodes at a same depth or height in the hierarchy, or nodes that share some other characteristics in the hierarchy, to parent nodes of the selected-level nodes, and a "path mapping" that maps a plurality of nodes other than the selected-level nodes to a plurality of paths, within the hierarchy, to the plurality of nodes. The parent mapping and the path mapping may be stored in different data structures or may be different parts of the same data structure that maps some nodes just to parents and other nodes to paths. The stored mappings may serve as indices to the stored data or may replace the stored data.

The computing device(s) also include processor(s) configured to determine path(s) to specified node(s) based on the stored mappings. In one embodiment, a request processor, such as hardware and/or stored instructions operating on the computing device(s), receives a request that identifies or specifies node(s) in a hierarchy of nodes. In response to the request, the request processor causes a path module, such as hardware and/or stored instructions operating on the computing device(s), to determine path(s), within the hierarchy, to the specified node(s) using stored mappings. The path module determines the path(s) at least in part by mapping the specified node(s) to particular parent node(s) of the specified node(s) using a parent mapping that maps a first subset of the hierarchy, such as nodes on a particular level of the hierarchy, to parent nodes of the first subset. The path module also maps the particular parent node(s) to particular path(s), within the hierarchy, using a path mapping that maps a second subset of the hierarchy to paths, within the hierarchy, to the second subset. In one embodiment, the particular path(s) to the particular parent node(s) that were determined using the path mapping may be assembled with the connections from the particular parent node(s) to the specified node(s) that were determined using the parent mapping to form path(s) within the hierarchy to the specified node(s).

The path module may then perform responsive action(s) based at least in part on the path(s) within the hierarchy to the specified node(s). For example, the path module may store the path(s) on a non-transitory computer-readable storage medium as expression(s), such as the example expressions "A/B1/C" and "A/B2/C" that represent example paths to an example node "C". The expression(s) may be stored in association with at least part of the request or in association with the specified node(s). As another example, the path(s) may be sent in a message to a client that initiated the request, and the message may include expression(s) that identify the path(s). In yet another example, the path module responds to the request by merely indicating whether or not any path(s) were found to the specified node.

In another example, the request may check for the existence of specified node(s) in the hierarchy, and the path, parent, and child mappings may be used to determine whether the specified node(s) exist. For example, the request may request a determination of whether any of the specified node(s) are present among target level nodes such as user identifiers or leaf nodes, and the path module may respond to the request by indicating whether or not the specified node(s) were in the mapping(s) for the target level.

In one embodiment, the request identifies multiple nodes including a target node and at least one other node. In this embodiment, the path module may evaluate the request by using the parent and path mappings to determine paths between the at least one other node and the target node. The path module may then respond to the request by storing or sending an electronic indication of whether or not the at least one other node is in any path to the target node.

As referred to herein, the "target level" or "selected level" refers to a level as measured from a top of a hierarchy (such as a third level from a top of the hierarchy), a level as measured from a bottom of a hierarchy (such as leaf nodes), or a level that describes certain nodes with certain characteristics (such as nodes that correspond to users or privileges, regardless of the number of ancestors (i.e., the depth of the nodes) or descendants (i.e., the height of the nodes) in paths to these nodes), for which parent and/or child mappings are stored but which are not included in path mapping(s). Parents or children of the target-level nodes are nodes that are directly connected to the target-level nodes, regardless of whether the parents or children have the same number of ancestors or descendants as other parents or children. The target level may be selected arbitrarily or based on some criteria, such as the level(s) of the hierarchy having the most nodes. Some hierarchies may have edges or links that skip over levels such that not every level is represented in every path. Some hierarchies may have paths that end at different levels. In these examples, if levels are measured from the top, leaf nodes may be on different levels; but, if levels are measured from the bottom, leaf nodes may be considered to be on the same level even though there are different numbers of nodes in the paths between the leaf nodes and the root node(s). In other words, a path to a fourth-level node from a top-level node may include fewer than four nodes even if the levels are measured from a top of the hierarchy. These embodiments may also be accommodated using the parent and path mappings and optionally the child mapping described herein as long as the correct path and parent and/or child information is stored in the mappings.

Creating a Parent Mapping for a Target Level of Leaf Nodes

In one embodiment, a node analyzer creates an adjacency list or parent mapping for a target level of nodes in a hierarchy of nodes. The parent mapping stores parent information for each node at the target level. The parent mapping may be stored with a child mapping that includes child information for each node if the node is not a leaf node.

The parent mapping and child mapping do not store path information beyond adjacent nodes. For example, the parent mapping may store links to parents of nodes in the target level, but the parent mapping does not also store paths to great grandparents or other non-parent ancestors of the target level. As another example, the child mapping may store links to children of nodes in the target level, but the child mapping does not also store paths to great grandchildren or other non-children descendants of the target level.

In one embodiment, the node analyzer may create a parent mapping for the target level of nodes in the corresponding level of a breadth-first traversal of the hierarchy of nodes. In another embodiment, the node analyzer modifies or appends a parent mapping each time the target level is reached in a depth-first traversal of the hierarchy of nodes. For each particular node in the target level, the node analyzer may create the parent mapping for the particular node by storing link(s) to parent(s) of the particular node in association with the particular node.

In one example, the node analyzer uses the particular nodes in the target level as keys to a hash function that maps the particular nodes to virtual addresses where information is stored that identifies the parent(s) of the particular nodes. If the particular nodes or identifiers of the particular nodes are unique, the mapped-to virtual addresses may also either be unique or may have a low probability of collision with other mapped-to virtual addresses. The node analyzer may operate on top of a virtual address layer that translates virtual addresses into physical addresses of non-transitory storage medium/media where the information is actually stored.

Figure 2:
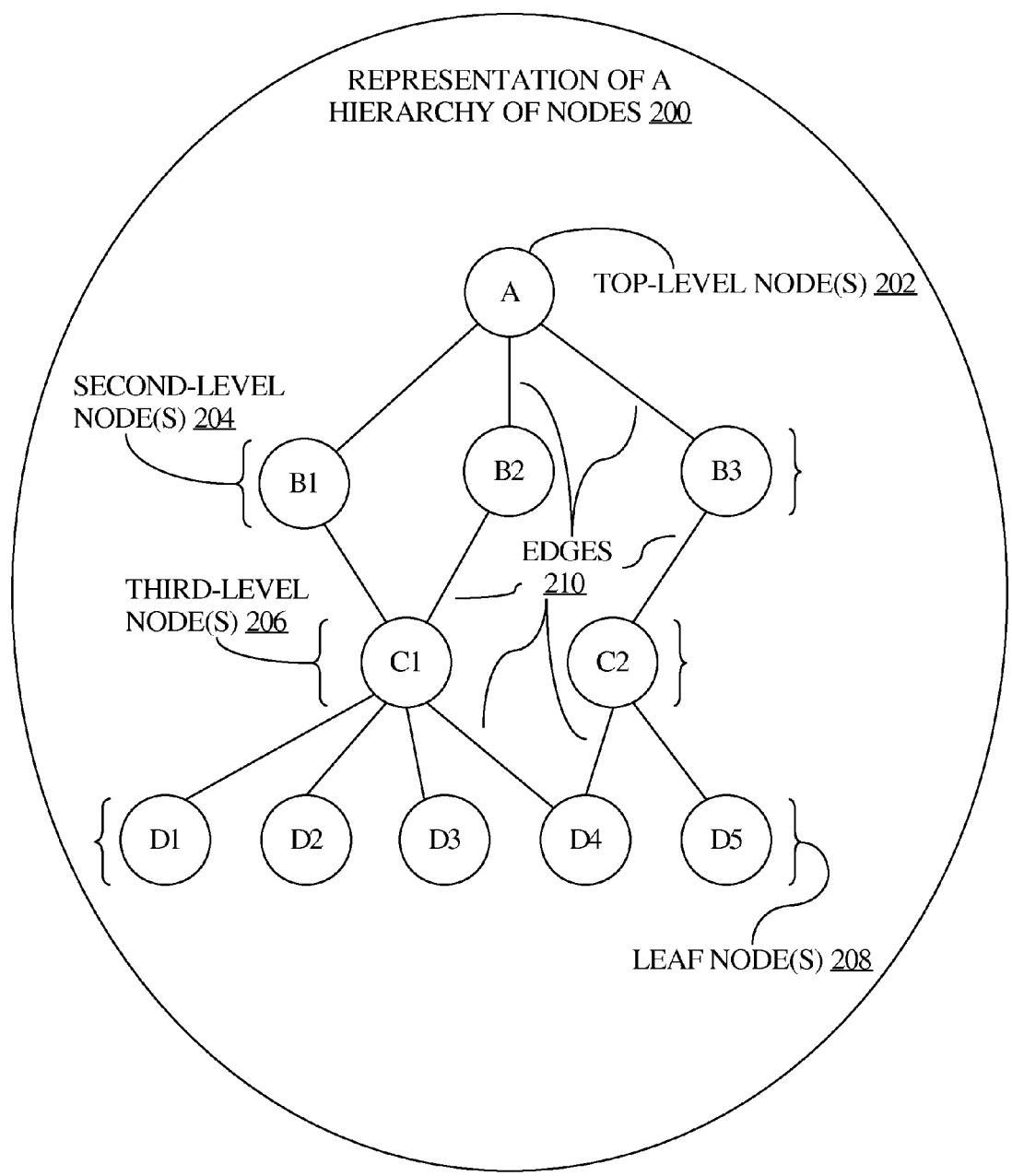
FIG. 2 illustrates an example representation of an example hierarchy of nodes.

FIG. 2 illustrates an example representation of an example hierarchy of nodes 200 where the leaf nodes 208 are treated as target-level nodes. As illustrated, representation 200 includes top-level node(s) 202 ("A") above second-level node(s) 204 ("B1," "B2," and "B3"). Edges 210 connect parent node A to children nodes B1, B2, and B3. Second-level node(s) 204 are above third-level node(s) 206 ("C1" and "C2"). Edges 210 connect parent nodes B1 and B2 to child node C1 and parent node B3 to child node C2. Third-level node(s) 206 are above leaf node(s) 208 ("D1," "D2," "D3," "D4," and "D5"). Edges 210 connect parent node C1 to children nodes D1-D4 and parent node C2 to children nodes D4-D5. In the example, nodes A, B1, B2, and C1 are ancestors of node D1, and nodes C2 and D4 are descendants of node B3. In the example, all nodes are descendants of node A.

Figure 3:
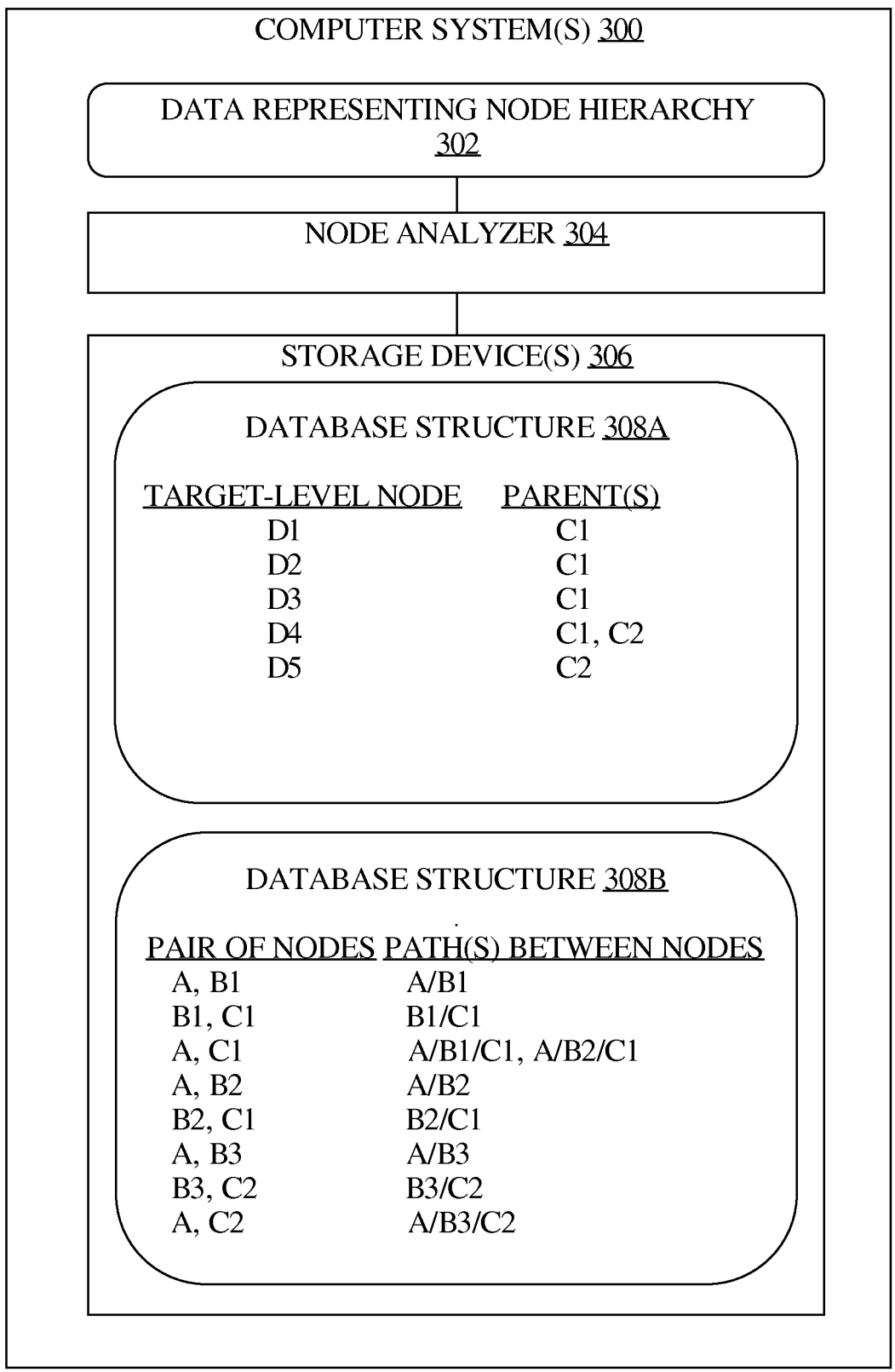
FIG. 3 illustrates example database structures that store information about the example hierarchy of nodes from FIG. 2, where the leaf nodes are treated as target-level nodes.

FIG. 3 illustrates example database structures that store information about the example hierarchy of nodes from FIG. 2. Computer system(s) 300 include node analyzer 304, which analyzes data representing node hierarchy 302. Node analyzer 304 creates, based on a node hierarchy such as the one represented in FIG. 2, database structures 308A and 308B on storage device(s) 306. The database structures may be tables, documents, data objects, or any other container for holding mappings. As shown, database structure 308A stores information about parents of target-level nodes D1, D2, D3, D4, and D5. In the example, each of the target-level nodes is represented in a different row or line, and one of the target-level nodes, D4, has two parents listed, C1 and C2. There is no requirement that every target-level node has a parent, and there is no limit on the number of parents that any target-level node may have. Database structures 308B will be discussed in more detail below with respect to the path mapping.

Creating a Path Mapping for Nodes Above the Target Level

The node analyzer also creates a path mapping for those nodes that are not in a level for which the parent mapping or child mapping has been created. In other words, the path mapping includes information for only a portion of the hierarchy that is not covered by target level(s). A path mapping that excludes nodes at the target level(s) may be significantly smaller in size than a path mapping that covers the entire hierarchy of nodes. In one example, the path mapping includes paths from each node in the portion of the hierarchy to each top-level node in the hierarchy. In another example, the path mapping includes paths between every pair of nodes that is connected in the portion of the hierarchy, whether or not the pair of nodes includes a top-level node.

In one embodiment, the node analyzer creates a path mapping for nodes that are not on a target level during a breadth-first traversal of a hierarchy of nodes. At each level of the breadth-first traversal, the node analyzer may modify or append paths ending at evaluated nodes with information about which nodes are connected to the evaluated nodes at a next level.

In another embodiment, the node analyzer creates a path mapping for nodes that are not on the target level during a depth-first traversal of the hierarchy of nodes. The node analyzer may add full paths and paths between nodes as the hierarchy is traversed down the full paths.

In one embodiment, the node analyzer creates the parent and path mappings during the same traversal of the hierarchy. In another embodiment, the node analyzer creates the parent and path mappings in parallel traversals of the hierarchy. The parent mapping may be created using a breadth-first traversal of the target level, and the path mapping may be created using a depth-first traversal of a subset of the hierarchy that excludes the target level. In various embodiments, multiple instances of node analyzers may operate in parallel to build the parent mapping and/or path mapping. For example, different instances of node analyzers may be responsible for creating different portions of the path mapping corresponding to different portions of the hierarchy, and another instance of a node analyzer may be responsible for creating portions of the path mapping that connect the different portions of the hierarchy.

In one embodiment, instead of storing the actual path between path endpoints, A and B, in the path table, the path endpoints are used as inputs to a hash function that provides a virtual address of a location in storage where the path between A and B is stored. For example, the node analyzer may use a hash function to map "A, B" to a pseudo-random virtual address of a block in memory, and the node analyzer may store the text-based or value-based path between A and B in that block in memory. The path module may determine the path between A and B by retrieving the text-based or value-based path from the location that is found by hashing "A, B" to a virtual address. In one embodiment, the node analyzer and path module operate on top of a virtual address layer that translates the virtual addresses into physical addresses in memory.

In FIG. 3, node analyzer 304 stores path information for a portion of the hierarchy of FIG. 2 in database structure 308B. As shown, database structure 308B stores path information for all pairs of nodes that are connected in the same path, directly or indirectly. The stored path information indicates that there is only one direct path between nodes A and B1, nodes B1 and C1, nodes A and B2, nodes B2 and C1, nodes A and B3, and nodes B3 and C2. The stored path information also specifies multiple complex paths (i.e., paths that include more than one connection) that exist between nodes A and C1 ("A/B1/C1" and "A/B2/C1"), and one complex path that exists between nodes A and C2 ("A/B3/C2"). Although the path information is organized in terms of pairs of nodes, the path information may also be organized for each node. For example, the path information could include the paths from each node to the top level of the hierarchy without including the paths to intermediate nodes that are not at the top level.

The target-level nodes, leaf node(s) 208, are excluded from the path table in database structure 308B because the parent information for leaf node(s) 208, but not path information, is stored separately for these nodes in database structure 308A. Excluding the target-level nodes from database structure 308A greatly reduces the number of node-to-node paths and thus greatly reduces the amount of space consumed by database structure 308A. Paths to selected ones of nodes D1-D5 may be constructed by assembling the parents for the selected nodes from database structure 308A and the paths to those parents from database structure 308B.

Using the Parent and Path Mappings to Determine Path(s) to Node(s)

In one embodiment, a request processor receives a request that identifies node(s), and the request processor causes a path module to determine path(s) to the identified node(s) using the stored mappings. The request processor may be connected to an application programming interface ("API"), graphical user interface ("GUI"), a network interface, or some other interface for receiving requests for path determinations. The request may identify node(s) based on the value(s) of the node(s). If a node value is unique among the hierarchy of nodes, then specifying the value may uniquely identify the node among the nodes in the hierarchy. If the value is not unique, then specifying a value may identify a set of nodes matching that value in the hierarchy. In one embodiment, nodes are located based on values using a value index. The value index may list node locations or identifiers and node values, and the list may be sorted based on node values to improve the lookup time.

The request may also identify nodes based on an identifier or physical location of the node. Each node value is stored at a particular location, and the identity of the node may be determined using the particular location. In one embodiment, nodes are located based on physical locations or identifiers. The physical locations or identifiers may be used to search the mappings for occurrences of the nodes in the path, parent, and child mappings.

FIG. 1 illustrates an example process for determining path(s) to node(s) in a hierarchy using stored information about the node(s). The example process may be performed by computing device(s) that have been specially configured with software and hardware to perform the steps. For a hierarchy with leaf nodes as the target-level node where a request identifies a node in the target level, such as node D4 of FIG. 2, the process may be simplified into steps 100, 104-106 and 116. The simplified process includes, in step 100, receiving a request that identifies particular node(s) in a hierarchy of nodes, such as node D4 of FIG. 2. In step 104, assuming the particular node(s) are on the target level for which parent information is stored, the particular node(s) may be mapped to parent node(s) using a parent mapping for nodes on the target level, such as the parent mapping in database structure 308A of FIG. 3, which maps D4 to C1 and C2. Then, in step 106, the parent node(s) from step 104 may be mapped to path(s) within part of the hierarchy using a path mapping such as the one in database structure 308B of FIG. 3. If the request is for full paths to the particular nodes, the paths between A and C1 (A/B1/C1, A/B2/C1) and A and C2 (A/B3/C2) may be located in database structure 308B. Assuming the target-level nodes are leaf nodes, the process may continue to step 116, the computing device(s) respond to the request based on path(s) to the particular node(s), such as A/B1/C1/D4, A/B2/C1/D4, and A/B3/C2/D4 in the example, which may be assembled from the parent(s) determined in step 104 and the path(s) to the parent(s) determined in step 106.

If the request specifies particular node(s) above the highest target level for which parent information is stored, such as node C1 of FIG. 2, then the parent information is not needed to determine path(s) to the particular node(s). The process may include a determination as to whether the particular node(s) are on a level for which parent information is stored in step 102. The determination as to whether the particular node(s) are on the level for which parent information is stored may include searching parent mapping(s), such as the parent mapping in database structure 308A, for the particular node. In this case, in step 107, since the particular node(s) are not on a level for which parent information is stored, the particular node may be mapped to path(s) within part of the hierarchy using the path mapping such as the one in database structure 308B of FIG. 3. In the example, the path mapping indicates two paths between A and C1 (A/B1/C1 and A/B2/C1). The process may then continue to step 116, in which the path(s) from step 107 are used to perform a responsive action.

Creating Parent and Child Mappings for a Target Level that Includes Non-Leaf Nodes In one embodiment, the selected-level nodes of the parent mapping are non-leaf nodes in the hierarchy, and the stored mappings also include a "child mapping" that maps child nodes of the non-leaf nodes to the non-leaf nodes themselves. In one example, the child mapping is provided in a same database structure as the parent mapping. The structure may have three columns, a first of which specifies different nodes among the selected-level nodes, a second of which specifies parents of the different nodes, and a third of which specifies children of the different nodes.

Figure 4:
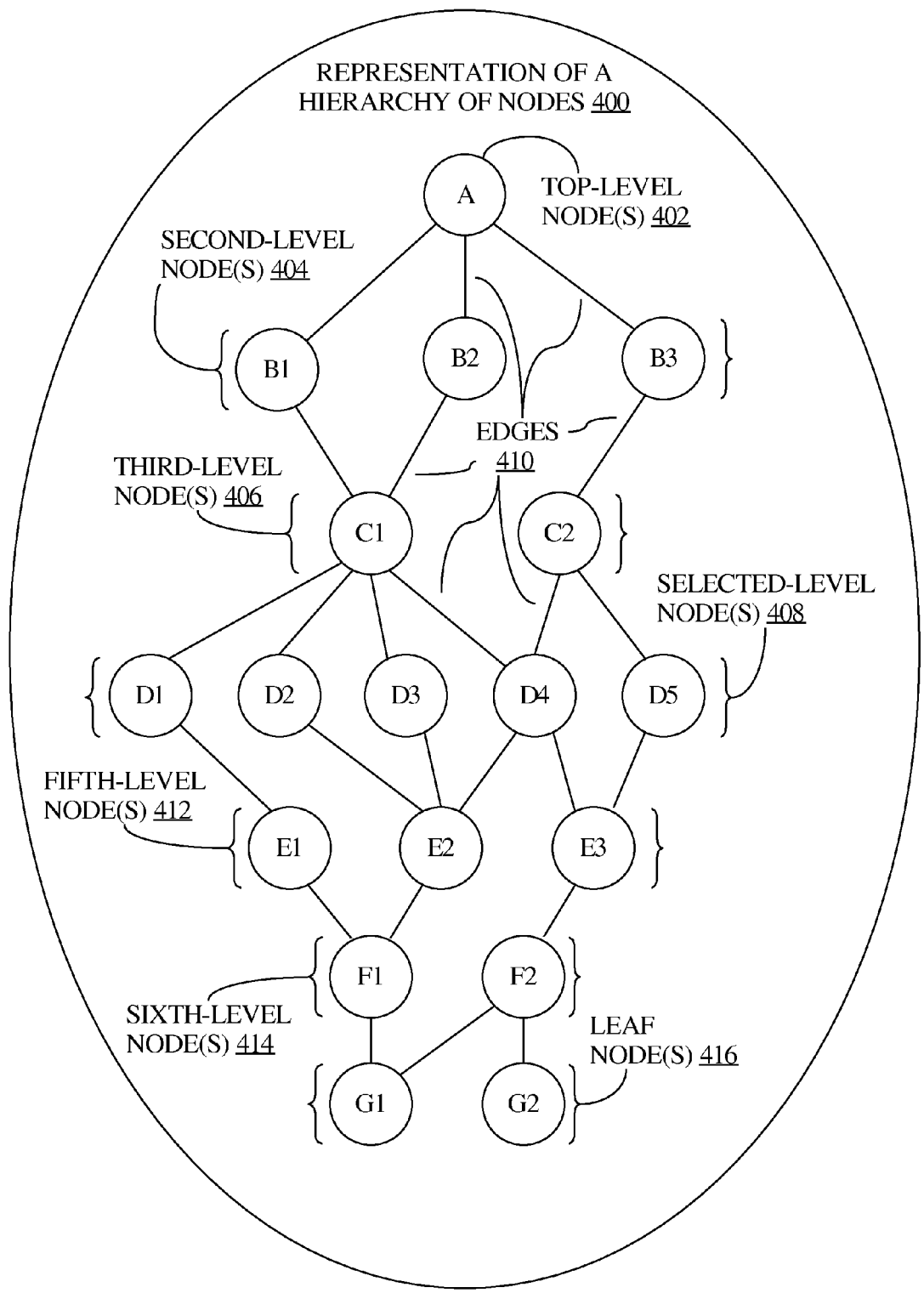
FIG. 4 illustrates another example representation of an example hierarchy of nodes.

FIG. 4 illustrates another example representation of an example hierarchy of nodes 400, where a certain level of non-leaf nodes 408 is treated as the target level. As shown, an upper subset of three levels of nodes is the same as the hierarchy of FIG. 2, and the selected level of node(s) 208 and 408 are the same except that the selected level 408 in FIG. 4 includes non-leaf nodes. Unlike the hierarchy in FIG. 2, the hierarchy in FIG. 4 also includes a lower subset of three levels of nodes. Although three levels are shown, subsets of nodes that are not on the target level may include any number of levels. Fifth-level of node(s) 412 ("E1," "E2," and "E3") is directly under selected level of node(s) 408. In the example, node E1 is a child of node D1, node E2 is a child of nodes D2-D4, and node E3 is a child of nodes D4 and D5. Sixth-level of node(s) 414 ("F1" and "F2") is below fifth-level of node(s) 412. As shown, node F1 is a child of nodes E1 and E2, and node F2 is a child of node E3. In FIG. 4, leaf node(s) 416 are not a selected level of nodes and are below sixth-level node(s) 414. In other examples, multiple levels of nodes may be selected for creation of parent mappings. As shown in FIG. 4, node G1 is a child of nodes F1 and F2, and node G2 is a child of node F2.

Figure 5:
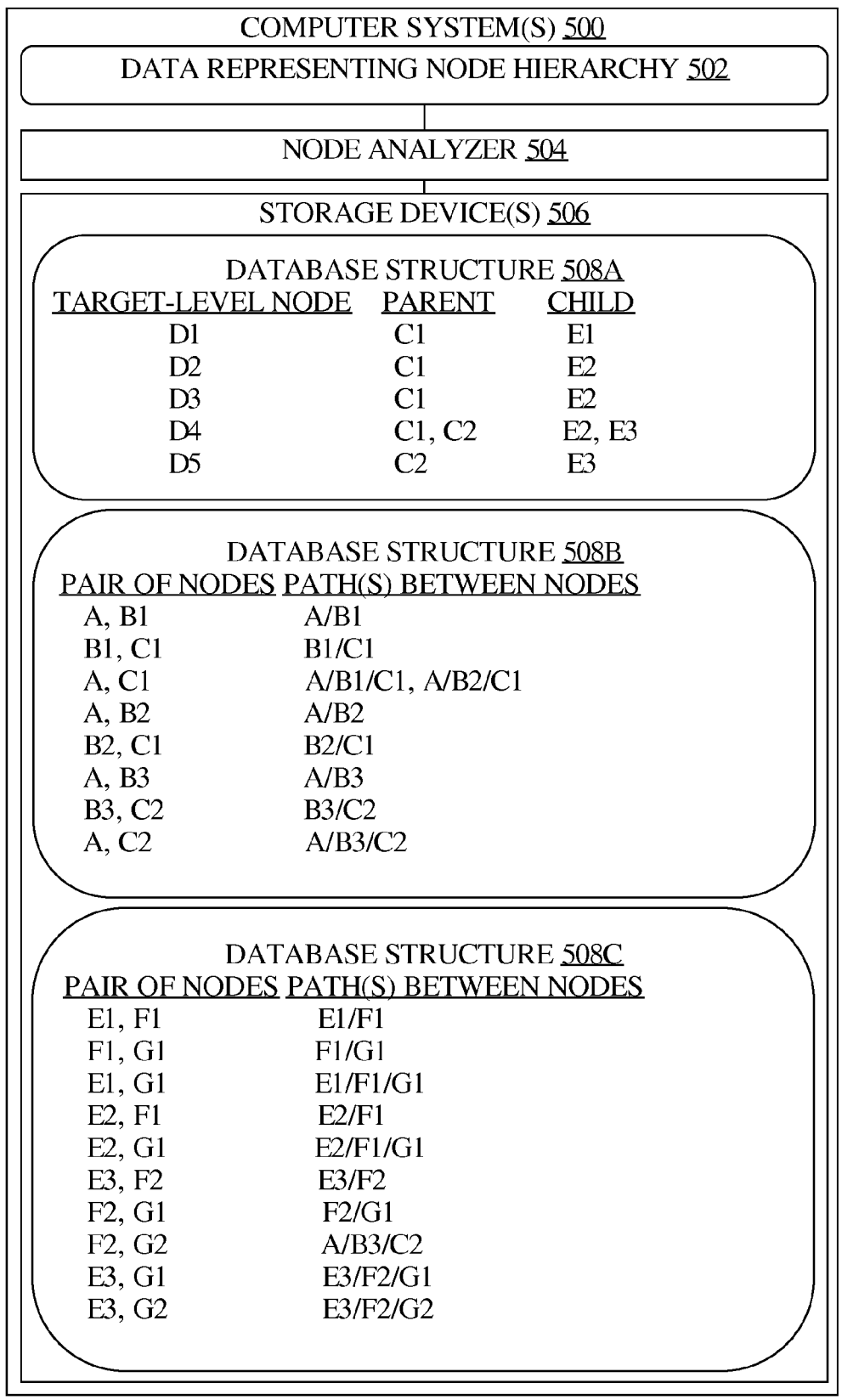
FIG. 5 illustrates example database structures that store information about the example hierarchy of nodes from FIG. 4, where mid-level nodes are treated as target-level nodes.

FIG. 5 illustrates example database structures 508A, 508B, and 508C that store information about the example hierarchy of nodes from FIG. 4. Node analyzer stores parent and child information for target level nodes in database structure 508A. In the example, target level node D4 has two parents, C1 and C2, that are specified in the parent mapping and two children, E2 and E3, that are specified in the child mapping. The remaining target level nodes have a single parent and a single child listed in the mappings. Different nodes in the target level may have different numbers of parents or children, and some nodes may have no parents and/or no children in different example hierarchies. Database structures 508B and 508C are discussed in more detail below with respect to the path mappings for nodes below and above the target level.

Creating Path Mappings for Nodes Below and Above the Target Level

The stored mappings may include both an "upper path mapping" that maps a first plurality of nodes above the selected-level nodes to a plurality of paths in an upper hierarchy of nodes to the first plurality of nodes, and a "lower path mapping" that maps a second plurality of nodes below the selected-level nodes to a plurality of paths in a lower hierarchy of nodes to the second plurality of nodes. The bottom-level nodes in the upper hierarchy are the parent nodes of the selected-level nodes, and the top-level nodes in the lower hierarchy are the child nodes of the selected-level nodes.

As shown in FIG. 5, node analyzer 504 stores path information for an upper subset of nodes in database structure 508B (i.e., nodes that are above the target level) and path information for a lower subset of nodes in database structure 508C (i.e., nodes that are below the target level). Although only one target level and two subsets are shown in FIG. 5, multiple target levels and multiple subsets of nodes between the target levels may be used. In the illustrated example, both subsets of nodes that are represented in database structures 508B and 508C exclude the target level nodes, which are represented in the parent mapping rather than the path mappings. The contents of database structure 508B is the same as the contents of database structure 308B in FIG. 3 because the upper subset of nodes represented by database structure 508B is the same as the subset of nodes represented by database structure 308B.

Database structure 508C includes a listing of node pairs in the lower subset of nodes. For each pair, the database structure includes a path between the pair. Most of the listings include direct paths between the pairs of nodes. The pairs (E1, G1), (E2, G1), (F2, G2), (E3, G1), and (E3, G2) include complex paths that pass through an intermediate node. Although none of the listings in database structure 508C include multiple paths, different hierarchies may include lower subsets of nodes that do have multiple paths. Also, although the table lists all pairs of nodes that are connected in the lower subset, the table could just list connections between the top-level of the lower subset (the fifth-level node(s) 412) and the other nodes in the lower subset (the sixth-level node(s) 414 and leaf node(s) 416).

Using the Parent, Child, and Path Mappings to Determine Path(s) to Node(s)

In one embodiment, a request is received for a path to specified node(s) that are below a level for which a parent mapping exists. In other words, the specified node is a descendant of node(s) at the level for which the parent mapping exists. In this embodiment, the path module may determine lower path(s) by using a path mapping to map the specified node to child node(s) of the node(s) that are at the level for which the parent mapping exists. The child node(s) may then be mapped to the node(s) that are at the level for which the parent mapping exists using a child mapping. The path module then uses the parent mapping to determine parent(s) of the node(s) that are at the level for which the parent mapping exists, and another path mapping to determine upper path(s) to the parent(s). The path module may then assemble the upper path(s), the node(s) that are at the level for which the parent mapping exists, and the lower path(s) to determine path(s) through the hierarchy to the specified node(s).

As shown in FIG. 1, a request may identify particular node(s) in a hierarchy of nodes, such as F1 in FIG. 4. In this example, a lower part of the hierarchy contains the particular node(s). The lower hierarchy is defined as the hierarchy containing nodes E1-E3, F1-F2, and G1-G2. The path(s) within the lower hierarchy may be determined as if the lower hierarchy was an upper hierarchy in either in step 106 or step 107. In the example, the path(s) within the lower hierarchy are determined in step 107 because node F1 is not on a level for which parent information is stored, as determined in step 102. In the example, the path(s) to F1 in the lower hierarchy may be determined using database structure 508C, which indicates both E1/F1 and E2/F1 map to F1. Because the path is below a level for which parent information is stored, as determined in step 108, a complete path within the full hierarchy of nodes containing A, B1-B3, C1-C2, D1-D5, E1-E3, F1-F2, and G1-G2 has not yet been determined for the particular node(s), such as F1 in the example.

In the illustrated embodiment, the hierarchy may include at least two parts, one of which is above a level for which parent information is stored (for example, including A, B1-B3, C1-C2) and one of which is below a level for which parent information is stored (for example, including E1-E3, F1-F2, G1-G2). In this case, root(s) of the path(s) from the part that was evaluated in step 108, such as E1 and E2 in the paths E1/F1 and E2/F1, may be mapped to node(s) on a level for which parent information is stored using a child mapping for the level in step 110. In the example, node E1 is mapped to node D1 and node E2 is mapped to nodes D2-D4 using the child mapping in database structure 508A. Then, the node(s) from step 110 (for example, D1-D4) may be mapped to parent node(s) using a parent mapping for the level in step 112, such as the parent mapping in database structure 508A. In the example, the parent mapping maps D1-D3 to C1 and D4 to C1 and C2. In step 114, the parent node(s) from step 112 (for example, C1 and C2) are mapped to path(s) within a part of the hierarchy using a path mapping for another portion of the hierarchy, such as the upper hierarchy containing nodes A, B1-B3, and C1-C2 in FIG. 4. In the example, C1 is mapped to A using two paths, A/B1/C1 and A/B2/C1, and C2 is mapped to A using one path, A/B3/C2. The part determined in step 114 (for example, A/B1/C1, A/B2/C1, A/B3/C2) is above the part determined in either step 106 or step 107 (for example, E1/F1 and E2/F1), but the part is not necessarily at the top of the hierarchy. The process then returns to step 108 to determine whether the part from step 114 is still below a level for which parent information is stored. If so, the process repeats steps 110-114 and then 108 again until the last part from step 114 is no longer below any target levels. In the example, the process reaches the top of the hierarchy after the first iteration of step 114. Once the last determined part is no longer below any target levels, the entire path may be assembled based on: the parent and path mappings in steps 104-106 or the path mapping from step 107 (for example, E1/F1 and E2/F1), and the child (for example, D1:E1 and D2-D4:E2), parent (for example, C1:D1-D4 and C2:D4), and path mappings in steps 110-114 (for example, A/B1/C1, A/B2/C1, A/B3/C2), which may have been repeated multiple times for multiple target rows. The process may then respond to the request in step 116 based on path(s) to the particular node(s) as assembled from the parent mappings, child mappings, and path mappings. The paths may be assembled by matching the endpoints of the paths with the parent/child mappings. In the example, the assembled paths may include A/B1/C1/*D1/E1/F1, A/B1/C1/*D2/E2/F1, A/B1/C1/*D3/E2/F1, A/B1/C1/*D4/E2/F1; A/B2/C1/*D1/E1/F1, A/B2/C1/*D2/E2/F1, A/B2/C1/*D3/E2/F1, A/B2/C1/*D4/E2/F1; and A/B3/C2/D4/E2/F1. In the example, branch points resulting from a single parent that is mapped to multiple selected-level nodes, as indicated by the parent mapping, have been starred.

In another embodiment that is not illustrated to retain the simplicity of FIG. 1, the top-level could be a level for which child information is stored but parent information is not stored. In this case, the process would include a step for determining that the part from step 106 or step 107 is below a level for which child information is stored, and a child mapping would be used to link the path(s) from step 106 or step 107 to the parent node at a target level for which child information is stored. Such a step may also be performed after steps 108-114 if there are target levels below a target level at the top of the hierarchy.

In the two examples from FIGS. 1-5, the path was found between a root node, A, and a node specified in the request, node D4 in the first example and node F1 in the second example. In other examples, the request may specify a node of interest other than the root node. In the first example, if the request had requested a path from node B2 instead of node A, then the process may include, instead of looking for paths between A and C1 and A and C2 using database structure 308B, a step of looking for paths between B2 and C1 and B2 and C2 using database structure 308B. In the example, because there is no path between B2 and C2, the resulting path between B2 and D4 may be determined to be only B2/C1/D4.

Similarly, if the request in the second example had requested a path from node B2 to F1, instead of from A to F1, then the process may include, instead of looking for paths between A and C1 and A and C2 using database structure 508B, a step of looking for paths between B2 and C1 and B2 and C2 using database structure 508B. In the example, because there is no path between B2 and C2, the resulting path between B2 and D4 may be determined to be A/B2/C1/*D1/E1/F1, A/B2/C1/*D2/E2/F1, A/B2/C1/*D3/E2/F1, and A/B2/C1/*D4/E2/F1 (branch points starred).

In various embodiments shown, a path to a specified node is determined using a bottom-up approach. In an alternate embodiment, the path may be determined using a top-down approach, starting with a root node or a highest-level specified node and traversing the path mapping(s), parent mapping(s), and optionally child mapping(s) downwardly toward a lowest-level specified node.

Selecting a Level

A level, or group of nodes that share a common characteristic, may selected based on information about the level such as how many nodes are in the level. The information may be compared to information about other levels of the hierarchy, such as how many nodes are in the other levels. In one embodiment, a level with a highest number of nodes is selected for creation of the parent mappings and for exclusion from the path mappings. In another embodiment, a leaf node level is selected for the creation of the parent mappings and for exclusion from the path mappings.

In yet another embodiment, level(s) are selected based on a threshold that may or may not be relative to other levels in the hierarchy. For example, level(s) that contain over a threshold number of nodes may be selected for inclusion in the parent mappings and exclusion from the path mappings, and level(s) that contain fewer than the threshold may be selected for exclusion from the parent mappings and inclusion in the path mappings. Multiple levels may be selected for inclusion in the parent mappings and exclusion from the path mappings, and the parent and child information retained for these levels may be traversed from the lower portion(s) of the hierarchy to the upper portion(s) of the hierarchy through the selected level(s) that separate the different portions of the hierarchy. In this example, the lower portion(s) of the hierarchy and the upper portion(s) of the hierarchy include the nodes at the non-selected levels.

Example of Checking Security Privileges Using the Stored Mappings

In one example, a request is received from a client, such as an application, inquiring about security privileges of a user. The request may be to determine whether a particular user has default privilege(s) or whether the particular user has specified privilege(s). The request may identify the particular user and optionally the privilege(s) of concern. A path module may evaluate the request by determining whether the identified privilege(s) are within a path of that is connected to the particular user in a privilege tree or privilege hierarchy.

Privilege tree(s) or a privilege hierarchy may include level(s) of privileges that are connected to level(s) of roles, and the level(s) of roles may be connected to level(s) of users. The level of users may be at the top of the privilege tree(s) or at the bottom of the privilege tree(s).

In one example, an application contains one application user and 20 schemas, each schema having 50 tables. Different roles are granted different privileges. In the example, the privilege "SELECT" is granted to a role "REVIEWER," the privileges "UPDATE," "DELETE," and "INSERT" to a role "WRITER," and all privileges, including also "CREATE ANY TABLE," "ALTER ANY TABLE," and "DROP ANY TABLE" to a top-level "APPS" user. In the example, if it takes 4 bytes to store a user and a role, 2 bytes to store a system privilege, and 5 bytes to store an object privilege (4 bytes for the object identifier and 1 byte for the privilege identifier), storing a path table that includes full paths between every node may consume approximately 300 kilobytes (KB) in storage space, which is significant especially if such space is consumed in memory. In the example, storing parent links for every node may consume approximately 44 KB in storage space. Similarly, storing the parent links for only leaf nodes and paths for only non-leaf nodes may consume approximately 44 KB in storage space.

In one embodiment, the path module may select a privilege hierarchy by locating a privilege hierarchy that includes a user specified in the request as a top-level node. In the selected hierarchy, the path module may start at the nodes corresponding to the identified privilege(s) and traverse the privilege hierarchy upwardly using the parent and path mappings and optionally the child mapping to determine whether the identified privilege(s) are connected to the user. In a simple case, traversal of the privilege hierarchy may involve a single lookup of a parent mapping and a single lookup of a path mapping rather than a number of lookups that depends on the depth of the hierarchy. If there is a path between a respective privilege and the user, then the user may be said to have that respective privilege.

In the APPS example above, finding the privilege grant paths from APPS to SELECT for a particular user and a particular table may cost 4T+4003T' in processor time if traversing a hierarchy from node to node using parent links for every node, where T is the time cost of one hash lookup and T' is the time cost to compare two privileges. In the example, a single lookup, with cost T, could be performed if full paths were stored in a path table, but storing the full paths may consume too much space. Finally, in the example, performing a single lookup in the parent mapping and a single lookup in the path mapping may cost 2T, and the parent mapping for leaf nodes and path mapping for non-leaf nodes may consume considerably less space than the full path table.

The path module may respond to the request by indicating whether or not the particular user has the specified privilege(s) based on the determined path(s) to a particular node corresponding to the particular user.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
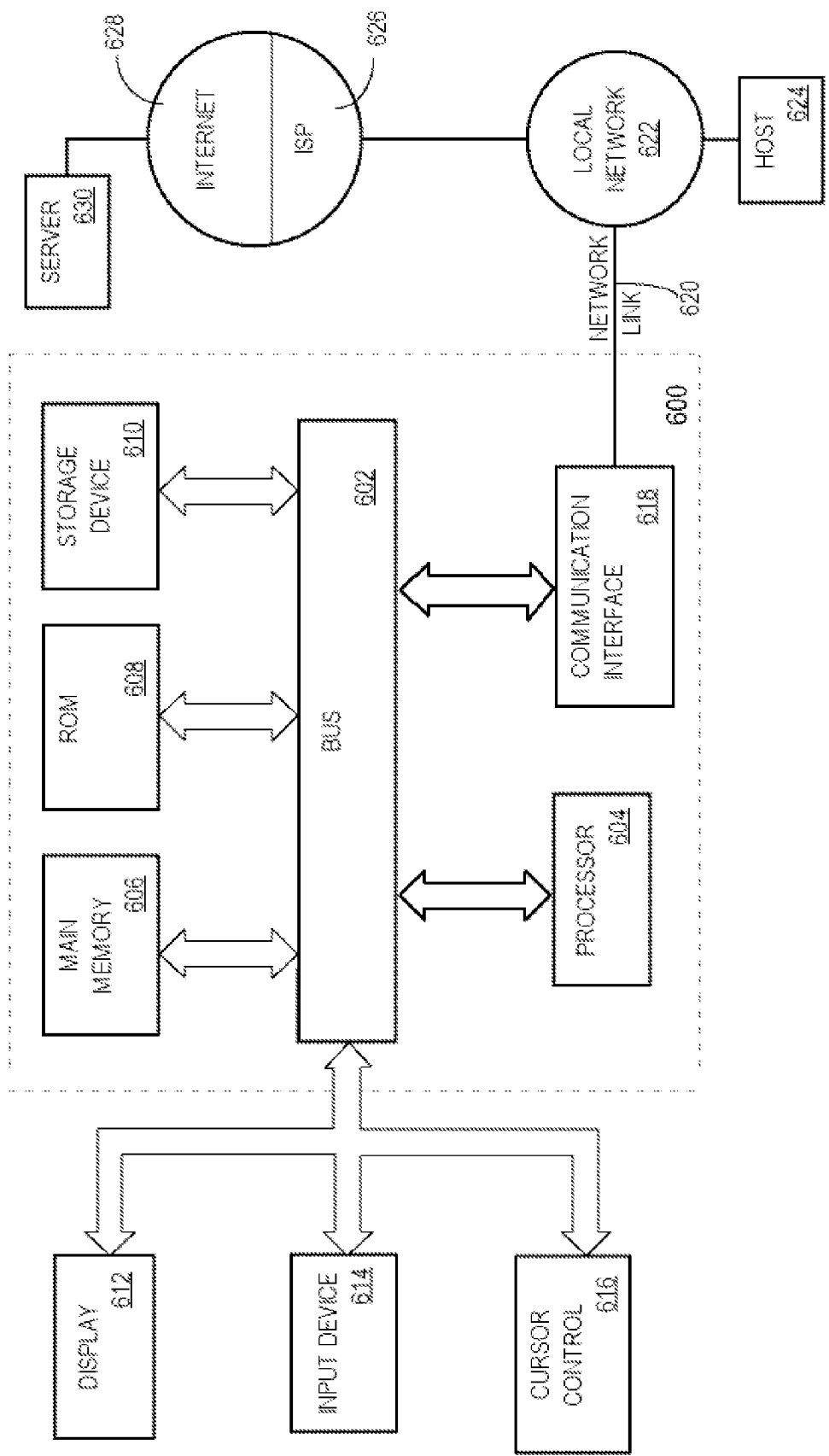
FIG. 6 illustrates an example computer system on which example embodiments described herein may be implemented. Although a single instance of the example computer system is depicted, multiple instances of the example computer system or of various elements thereof may function together to implement the example embodiments described herein.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

As used herein, the terms "first," "second," "third," "fourth," and "particular" are naming conventions that are used to introduce and reference members of a set. Unless otherwise expressly indicated, these terms are not intended to provide any ordering information about the members in the set. For example, a "first" member may or may not be at a beginning of the set, and, unless otherwise specified, may or may not be before a "second" member in the set, even if the set is referred to as a "list" or some other ordered arrangement of items.

To the extent that any steps are provided herein, an order that the steps are written is not necessarily an order that the steps are performed unless a later listed step is actually dependent on an earlier listed step or unless a particular ordering is expressly required. For example, a later listed step that uses or stores A may be dependent on an earlier listed step that receives or generates A but not necessarily on another earlier listed step that also uses or stores A. Therefore, the later listed step may be performed after one of the earlier listed steps but not necessarily after both of the earlier listed steps.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   storing data comprising a hierarchy of nodes;
   analyzing the stored data to generate stored mappings comprising:
      a first mapping that maps selected-level nodes in the hierarchy to parent nodes of the selected-level nodes, and
      a second mapping that maps a plurality of nodes other than the selected-level nodes to a plurality of paths to the plurality of nodes;
      wherein the plurality of paths are within the hierarchy of nodes and exclude paths to at least some of the selected-level nodes in the hierarchy of nodes;
   generating the stored mappings based on the first mapping and the second mapping of the plurality of nodes;
   storing an indication that the stored mappings represent the hierarchy of nodes;
   wherein the method is performed by one or more computing devices.

2. The method of claim 1, wherein the first mapping is stored in a first data structure, and the second mapping is stored in a second data structure.

3. The method of claim 1, wherein the selected-level nodes are leaf nodes in the hierarchy.

4. The method of claim 1, wherein the selected-level nodes comprise non-leaf nodes in the hierarchy, wherein the stored mappings further comprise a third mapping that maps child nodes of the non-leaf nodes to the non-leaf nodes, and a fourth mapping that maps descendant nodes of the child nodes to paths between the descendant nodes and the child nodes.

5. A computer-implemented method comprising:
   receiving a request that identifies, using a path expression that identifies one or more paths, a particular node in a hierarchy of nodes;
      based on the path expression received in the request, determining at least one first path to the particular node using stored mappings at least in part by:
         mapping at least one first node to at least one parent node of the at least one first node using a first mapping that maps a first subset of the hierarchy to parent nodes of the first subset, and
         mapping the at least one parent node to at least one second path, within the hierarchy of nodes, using a second mapping that maps a second subset of the hierarchy to second paths to the second subset;
      wherein the second paths are within the hierarchy of nodes and exclude paths to at least some nodes in the first subset of the hierarchy of nodes;
   responding to the request based at least in part on the at least one first path to the particular node;
   wherein the at least one first path is within the hierarchy of nodes;
   wherein the method is performed by one or more computing devices.

6. The method of claim 5, wherein the first mapping is stored in a first data structure, and the second mapping is stored in a second data structure.

7. The method of claim 5, wherein the first subset comprises nodes of a particular level in the hierarchy.

8. The method of claim 5, wherein the first subset comprises leaf nodes in the hierarchy, wherein the at least one first node is the particular node that is identified by the request, and wherein the particular node is a leaf node.

9. The method of claim 5, wherein the first subset comprises non-leaf nodes in the hierarchy, further comprising:
mapping the particular node to at least one child node of the at least one first node using a third mapping that maps descendant nodes of child nodes of the first subset to the child nodes;
mapping the at least one child node to the at least one first node using a fourth mapping that maps the child nodes of the first subset to the first subset.

10. The method of claim 5, wherein responding to the request comprises storing the at least one first path on a non-transitory computer-readable storage medium as at least one expression.

11. The method of claim 5, wherein the request is received from a client; wherein responding to the request comprises sending a message to the client; and wherein the message comprises at least one expression that identifies the at least one first path.

12. The method of claim 5, wherein the request identifies two or more nodes comprising the particular node and at least one other node, and wherein responding to the request comprises indicating whether or not the at least one other node is in the at least one first path to the particular node.

13. The method of claim 5, wherein the first subset comprises nodes that identify privileges, wherein the second subset comprises nodes that identify roles and users, wherein the at least one first node is the particular node that is identified by the request, wherein the particular node identifies a particular privilege, and wherein responding to the request comprises indicating whether or not a particular user has the particular privilege based at least in part on the at least one first path to the particular node.

14. One or more non-transitory computer-readable storage media storing instructions which,
when executed, cause:
storing data comprising a hierarchy of nodes;
analyzing the stored data to generate stored mappings comprising:
a first mapping that maps selected-level nodes in the hierarchy to parent nodes of the selected-level nodes, and
a second mapping that maps a plurality of nodes other than the selected-level nodes to a plurality of paths to the plurality of nodes;
wherein the plurality of paths are within the hierarchy of nodes and exclude paths to at least some of the selected-level nodes in the hierarchy of nodes;
generating the stored mappings based on the first mapping and the second mapping of the plurality of nodes;
storing an indication that the stored mappings represent the hierarchy of nodes.

15. The one or more non-transitory computer-readable storage media of claim 14, wherein the first mapping is stored in a first data structure, and the second mapping is stored in a second data structure.

16. The one or more non-transitory computer-readable storage media of claim 14, wherein the selected-level nodes are leaf nodes in the hierarchy.

17. The one or more non-transitory computer-readable storage media of claim 14, wherein the selected-level nodes comprise non-leaf nodes in the hierarchy, wherein the stored mappings further comprise a third mapping that maps child nodes of the non-leaf nodes to the non-leaf nodes, and a fourth mapping that maps descendant nodes of the child nodes to paths between the descendant nodes and the child nodes.

18. One or more non-transitory computer-readable storage media storing instructions which, when executed, cause:
receiving a request that identifies, using a path expression that identifies one or more paths, a particular node in a hierarchy of nodes;
based on the path expression received in the request, determining at least one first path to the particular node using stored mappings at least in part by:
mapping at least one first node to at least one parent node of the at least one first node using a first mapping that maps a first subset of the hierarchy to parent nodes of the first subset, and
mapping the at least one parent node to at least one second path, within the hierarchy of nodes, using a second mapping that maps a second subset of the hierarchy to second paths to the second subset;
wherein the second paths are within the hierarchy of nodes and exclude paths to at least some nodes in the first subset of the hierarchy of nodes;
responding to the request based at least in part on the at least one first path to the particular node;
wherein the at least one first path is within the hierarchy of nodes.

19. The one or more non-transitory computer-readable storage media of claim 18, wherein the first mapping is stored in a first data structure, and the second mapping is stored in a second data structure.

20. The one or more non-transitory computer-readable storage media of claim 18, wherein the first subset comprises nodes of a particular level in the hierarchy.

21. The one or more non-transitory computer-readable storage media of claim 18, wherein the first subset comprises leaf nodes in the hierarchy, wherein the at least one first node is the particular node that is identified by the request, and wherein the particular node is a leaf node.

22. The one or more non-transitory computer-readable storage media of claim 18, wherein the first subset comprises non-leaf nodes in the hierarchy, wherein the instructions further cause:
mapping the particular node to at least one child node of the at least one first node using a third mapping that maps descendant nodes of child nodes of the first subset to the child nodes;
mapping the at least one child node to the at least one first node using a fourth mapping that maps the child nodes of the first subset to the first subset.

23. The one or more non-transitory computer-readable storage media of claim 18, wherein responding to the request comprises storing the at least one first path on a non-transitory computer-readable storage medium as at least one expression.

24. The one or more non-transitory computer-readable storage media of claim 18, wherein the request is received from a client; wherein responding to the request comprises sending a message to the client; and wherein the message comprises at least one expression that identifies the at least one first path.

25. The one or more non-transitory computer-readable storage media of claim 18, wherein the request identifies two or more nodes comprising the particular node and at least one other node, and wherein responding to the request comprises indicating whether or not the at least one other node is in the at least one first path to the particular node.

26. The one or more non-transitory computer-readable storage media of claim 18, wherein the first subset comprises nodes that identify privileges, wherein the second subset comprises nodes that identify roles and users, wherein the at least one first node is the particular node that is identified by the request, wherein the particular node identifies a particular privilege, and wherein responding to the request comprises indicating whether or not a particular user has the particular privilege based at least in part on the at least one first path to the particular node.

* * * * *